W. P. HOPKINS.
Improvement in Work-Holders for Lathes.
No. 132,400. Patented Oct. 22, 1872.
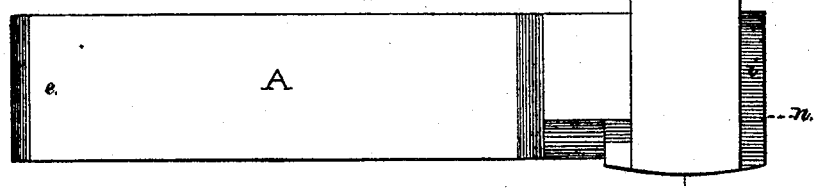
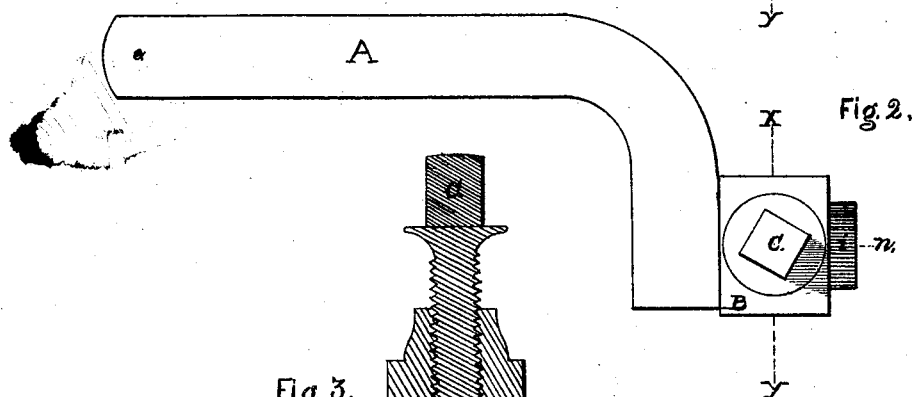
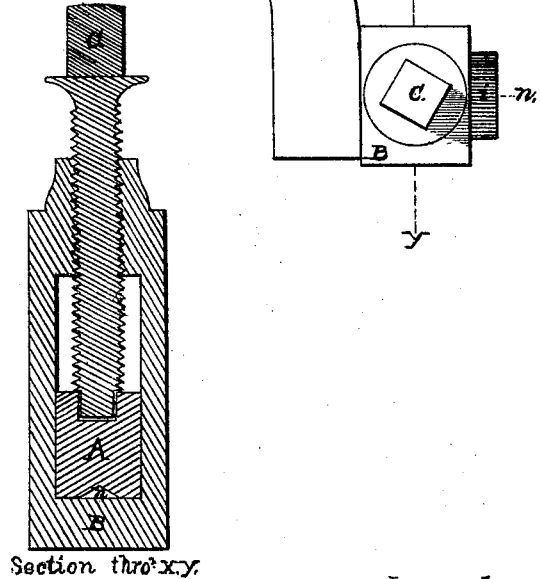
Witnesses.
Albert H. Stevens
William W. Colby
Inventor.
William P. Hopkins.

UNITED STATES PATENT OFFICE.

WILLIAM P. HOPKINS, OF LAWRENCE, MASSACHUSETTS.

IMPROVEMENT IN WORK-HOLDERS FOR LATHES.

Specification forming part of Letters Patent No. 132,400, dated October 22, 1872.

*To all whom it may concern:*

Be it known that I, WILLIAM P. HOPKINS, of Lawrence, in the county of Essex and State of Massachusetts, have invented a new and useful Device for Holding Taps or other suitable articles to be fluted, grooved, or operated upon by a revolving cutter in an Engine-Lathe; and I do hereby declare that the following is a full, clear, and exact description thereof, which will enable others skilled in the art to make and use the same, reference being had to the accompanying drawing forming part of this specification.

The object of this invention is to provide cheap, efficient, and convenient means for holding taps or other similar articles to be fluted, grooved, or operated upon by a revolving cutter in an engine-lathe, even in the same in which it was turned; the device being secured to the lathe-carriage tool-post in the same manner as ordinary cutting-tools usually are, by using the same machine to flute or groove articles as is used to turn them with, prevents the interruption of the machine commonly employed in its operations, thus effecting a great saving of time. Heretofore it has been common to secure taps and other similar articles to be fluted, grooved, or operated upon by the centers in the ends of the same, by which they have been turned. This method necessitates extensive and cumbersome contrivances, which require much skill and valuable time to adjust and use.

Figure 1 is a side elevation of my invention. Fig. 2 is a top view of the same. Fig. 3 is a vertical transverse section taken on the lines *x y* drawn across Figs. 1 and 2.

Similar letters of reference indicate corresponding parts. All the parts are made of metal.

A marks the bar of my device; B, the clamping-band; and C, the tightening-screw. The end *e* of the bar A is made of the proper form and dimensions as will permit its being secured in the tool-post of an engine-lathe in the same manner that the usual cutting-tools are, the end *i* extending toward the back of the lathe and receives the clamping-band B, and is grooved on the under side, as indicated at *n*, Fig. 3. The clamping-band B is provided with suitable internal screw-threads at the top for screwing the tightening-screw C down upon the top of the end *i* of the bar A. The band B is not in any manner fastened to the end *i* of the bar A, and is detachable from the bar A without loosening the end *e* of the bar A from a fixed position in the tool-post of a lathe. Between the end *e* and the end *i* the bar A forms two angular turns, so as to set the groove *n* at one side of the tool-post but parallel with the end *e*. Such an arrangement permits the securing of articles of unlimited dimensions by simply enlarging the lower portions of the band B. After the band B has been placed upon the end *i* of the bar A, with the tightening-screw C uppermost, as plainly shown in the drawing, the article to be held while being acted upon by the revolving cutter is laid up in the groove *n*, and by the use of a wrench applied at the top of the screw C the lower inside end of the band B is drawn firmly up against the article which is to be held while being acted upon by the cutter; and if it is desired to change the position once, or more than once, it can be done by loosening the screw C. The revolving cutter is secured upon a mandrel and turns upon the center of the lathe. The extent of the operation is regulated by the movement of the tool-carriage of the lathe and the screw regulating the elevation of the same.

One bar serves for a double purpose in this invention—to form an indispensable part of the device at one end, and at the other provide ample and ready means by which the whole can be secured in the tool-post, accomplishing the desired object in a very firm manner at a cheap cost of production. In the device shown and described in a patent to John Baillie February 25, 1868, it is evident that the limit of use is no larger than will permit the insertion in tool-post less the space occupied by the two holders, and the two holders must necessarily be straight; consequently their use is much limited.

Having thus described my invention, I claim as new and desire to secure by Letters Patent—

The bar A, in combination with the detachable band B and tightening-screw C, when said bar forms two angular turns so as to set the groove *n* at one side of the tool-post and parallel with the rear end *e* of the bar A, as shown and described, and for the purpose set forth.

WILLIAM P. HOPKINS.

Witnesses:
   WILLIAM W. COLBY,
   ALBERT H. STEARNS.